USOO5612112A

United States Patent [19]
Kotek et al.

[11] Patent Number: 5,612,112
[45] Date of Patent: Mar. 18, 1997

[54] SAXONY CARPETS HAVING FIBERS FORMED OF MODIFIED POLYAMIDE BLENDS

[75] Inventors: Richard Kotek, Arden, N.C.; Hans-Georg Matthies, Ludwigshafen, Germany

[73] Assignee: BASF Corporation, Mt. Olive, N.J.

[21] Appl. No.: 591,323

[22] Filed: Jan. 25, 1996

Related U.S. Application Data

[62] Division of Ser. No. 319,723, Oct. 7, 1994, Pat. No. 5,559,194, which is a continuation of Ser. No. 12,821, Feb. 3, 1993, abandoned.

[51] Int. Cl.⁶ .............................. B32B 3/02; B32B 3/16; B32B 27/02
[52] U.S. Cl. .............................. 428/92; 428/97; 525/392; 525/397
[58] Field of Search ................. 428/97, 92; 525/392, 525/397

[56] References Cited

U.S. PATENT DOCUMENTS

| | | | |
|---|---|---|---|
| 3,379,792 | 4/1968 | Finholt | 525/397 |
| 4,009,316 | 2/1977 | Wanger | 428/364 |
| 4,431,779 | 2/1984 | White et al. | 525/397 |
| 4,654,405 | 3/1987 | Jalbert et al. | 525/391 |
| 4,678,839 | 7/1987 | Hallgren et al. | 525/390 |
| 4,732,938 | 3/1988 | Grant et al. | 525/391 |
| 4,839,211 | 6/1989 | Wilkie et al. | 428/89 |
| 4,849,474 | 7/1989 | Gallucci | 525/92 B |
| 4,873,286 | 10/1989 | Gallucci et al. | 525/92 B |
| 4,882,222 | 11/1989 | Talley, Jr. et al. | 428/362 |
| 5,084,511 | 1/1992 | Abe et al. | 525/68 |
| 5,166,237 | 11/1992 | Abe et al. | 524/114 |

*Primary Examiner*—Terrel Morris
*Attorney, Agent, or Firm*—Nixon & Vanderhye P.C.

[57] ABSTRACT

Disclosed is a fiber-forming polymer blend, comprising:
a) a polyamide;
b) a miscible amorphous polymer; and
c) an immiscible amorphous polymer.

13 Claims, No Drawings

SAXONY CARPETS HAVING FIBERS FORMED OF MODIFIED POLYAMIDE BLENDS

This is a divisional of application Ser. No. 08/319,723, filed Oct. 7, 1994, now U.S. Pat. No. 5,559,194 which in turn is a continuation of application Ser. No. 08/012,821 filed Feb. 3, 1993 (now abandoned).

FIELD OF THE INVENTION

The present invention relates to novel modified carpet yarns having reduced thermal shrinkage, increased stiffness, improved wear performance and decreased flammability. More specifically this invention relates to carpet fibers modified with miscible and immiscible amorphous polymers and therefore capable of rendering improved physical properties and therefore suitable for the production of saxony carpets with improved appearance retention and durability.

BACKGROUND OF THE INVENTION

Nylon fibers are well known and have achieved a great commercial success. It is also recognized that due to excellent abrasion resistance, nylon fibers are being used for the manufacture of carpets. Although nylons perform extremely well in level loop type constructions, they show poor appearance retention characteristics in the saxony type carpets as described for example in U.S. Pat. Nos. 4,882,222 and 4,839,211. Furthermore, the conventional yarns used in this type of carpet tend also to exhibit high thermal shrinkage, low stiffness and poor flammability performance, particularly for the low pile weight carpets.

In contrast to semi-crystalline or partially crystalline fiber forming polymers such as poly(ethylene terephthalate), nylon 6 or nylon 6,6, amorphous polymers show very poor fiber forming properties and therefore are not used by industry. Consequently fibers from the compositions of nylons with amorphous polymer such as poly(phenylene oxide) (PPO) are practically unknown. Their use for the spinning of fibers is limited, partly because of polymer phase segregation in the melt due to immiscibility as well as crosslinking, and degradation processes which deteriorate or disable fiber spinning process. PPO polymer, however, is well recognized in the art for the production of numerous polymer blends and alloys as described for example in U.S. Pat. No. 4,732,938. In another example, U.S. Pat. No. 5,132,365 teaches the manufacture of poly (phenylene oxide)—polyamide compositions having improved impact strength and water resistance wherein the polyamide component comprises a mixture of amorphous and crystalline polyamide along with rubbery copolymer and compatibilizing material. Other amorphous polymers known in the art are for example polysulfones, polycarbonate and polymethyl methacrylate.

Although amorphous copolyamides are known in the art, particularly in those applications where clarity or transparency of a product is desirable, they also show poor or lack of the spinnability. Depending on the chemical structure, these materials show some miscibility with nylon polymers. A typical representative of this type of polymers is a copolyamide or terephthalic acid with 2,2,4- and 2,4,4-trimethylhexamethylenediamine manufactured by Dynamit Nobel Chemicals under TROGAMID®T.

Object of the present invention was to provide a modified polyamide for the manufacture of fibers having reduced thermal shrinkage, increased stiffness, improved wear performance, decreased flammability, and excellent uniformity and processing performance.

Another object was to provide a saxony carpet manufactured by using the modified polyamide fibers.

SUMMARY OF THE INVENTION

The objects of the present invention could be achieved with a fiber forming polymer blend, comprising:
a) a polyamide;
b) a miscible amorphous polymer; and
c) an immiscible amorphous polymer.

DETAILED DESCRIPTION OF THE INVENTION

Polyamides (a) are well known by the generic term "nylon". These are long chain polymers containing amide linkages (—CO—NH—) in the main polymer chain. Suitable fiber-forming or melt spinnable polyamides of interest for this invention include those which are obtained by the polymerization of a lactam or an amino acid, or those polymers formed by the condensation of a diamine and a dicarboxylic acid. Typical polyamides include nylon 6, nylon 6/6, nylon 6/9, nylon 6/10, nylon 6/12, nylon 6 T, nylon 11, nylon 12 and copolymers thereof or mixtures thereof. Polyamides can also be copolymers of nylon 6 or nylon 6/6 and a nylon salt obtained by reacting a dicarboxylic acid component such as terephthalic acid, isophthalic acid, adipic acid or sebacic acid with a diamine such as hexamethylene diamine, methaxylene diamine, or 1,4-bisaminomethyl cyclohexane. Preferred are poly-epsilon-caprolactam (nylon 6) and polyhexamethylene adipamide (nylon 6/6). However, most preferred is nylon 6.

Suitable miscible amorphous polymers (b) comprise copolyamides of terephthalic acid and 2,2,4-trimethylhexamethylene-diamine; terephthalic acid and 2,4,4,-trimethylhexamethylenediamine; hexamethylenediamine, isophthalic acid (I) and terephthalic acid (T). Preferred is a copolymer of hexamethylenediamine, isophthalic acid (I) and terephthtalic acid (T). This copolymer is coded as 6I/6T. The I to T ratio is from about 0.5:1–2:1, the preferred I to T ratio is from about 0.9:1.1–1.2:0.8.

Suitable immiscible amorphous polymers (c) comprise poly (phenylene oxides), polymethyl methacrylates, bisphenol A polycarbonates, polyethersulfones, polyarylethersulfones, polyphenylsulfones, and bisphenol A polysulfone. Preferred are poly (phenylene oxides) such as poly(2,6-dimethyl-1,4-phenylene oxide), poly(2,6-diethyl-1,4-phenylene oxide), poly(2-methyl-6-ethyl-1,4-phenylene oxide), poly(2-methyl-6-propyl-1,4-phenylene oxide), poly (2,6-dipropyl-1,4-phenylene oxide) and poly (2-ethyl-6-propyl-1,4-phenylene oxide).

Up to 50% by weight, in particular up to 20% by weight, of the poly (phenylene oxides) may be replaced by aromatic vinyl polymers. Suitable aromatic vinyl polymers are for example polystyrene, polyalphamethylstyrene and polyvinyltoluene, in particular polystyrene. Advantageously, the poly (phenylene oxides) used have an intrinsic viscosity of from 0.4 to 0.7 dl/g (measured in chloroform at 30° C.). Most preferred is poly (2,6-dimethyl-1,4-phenylene oxide).

Usually the poly (phenylene oxides) are modified for example by melt mixing with an $\alpha,\beta$-unsaturated compound in order to improve the quality of the polymer blend.

Suitable α,β-unsaturated compounds comprise α,β-unsaturated aliphatic mono- and dicarboxylic acids, -esters, -amides and -imides as well as aromatic vinyl monomers and mixtures thereof. Examples are acrylic acid, methacrylic acid, $C_1$–$C_4$ alkyl acrylates and methacrylate, mono- and di-$C_1$–$C_4$-alkyl fumarates, fumaric acid monoamide, maleimide, acrylamide and methacrylamide.

Component (a) may be used from about 40 to about 99.85% by weight, preferably from about 70 to about 89% by weight.

Component (b) may be used from about 0.05 to about 10% by weight, preferably from about 1 to about 5% by weight.

Component (c) may be used from about 0.1 to about 35% by weight, preferably from about 10 to about 25% by weight.

Preparation of a proper spinnable polymer composition from a nylon (a) with miscible (b) and immiscible amorphous polymers (c) is the most critical part of this invention. Extrusion grade of all polymers must be used. This operation will later affect the spinning performance, and the final physical properties of the fibers.

For the manufacture of the polymer blend compounds (a) (b) and (c) are melt mixed in a twin screw extruder at a temperature of from about 250° to about 350° C., preferably from about 270° to about 300° C. to form the fiber-forming polymer blend.

For the modification of compound (c) a preblend of poly (phenylene oxide) with at least one of the α,β-unsaturated compounds described above under compound (c) is mixed in an extruder at a temperature of from about 250° C. to about 350° C., preferably from about 260° to about 290° C.

If no modified poly (phenylene oxide) is used, the modification may be made in this step by adding at least one α,β-unsaturated compound described above under (c).

In addition to the primary components other additives can be included in the spinning composition. These include, but are not limited to, ultraviolet light stabilizers, antioxidants, pigments, dyes, antistatic agents, soil resists, stain resists, antimicrobial agents, nucleating agents, and the like.

A well known technique of fiber melt spinning in the art was used here for preparation of modified nylon fibers. Namely the fiber-forming polymer blend was fed into an extruder, melted and directed via Dowtherm® (Dow Corning, Michigan) heated polymer distribution lines to the spinning head. The polymer melt was then metered by a high efficiency gear pump to spin pack assembly and extruded through a spinnerette with a number of capillaries. The extruded filaments solidified, in a cross flow of chilled air. A finish consisting of lubrication oil and antistatic agents was then applied to the filament bundle for a proper processing performance. In the preferred technique, the filament bundle was drain, textured and wound-up to form bulk continuous filament (BCF). The one-step technique of BCF manufacture is known in the trade as spin-draw-texturing (SDT). Two step technique which involves spinning and a subsequent texturing is also suitable for the manufacturing BCF of this invention. The most preferred denier (defined as a weight in grams of a single filament with a length of 9000 meters) of single filament in BCF for carpet manufacturing is in the range from 15 to 25.

Because of reduced thermal shrinkage and increased stiffness, BCF of this invention is particularly useful in the manufacture of well known saxony carpets with improved wear performance and decreased flammability for floor covering applications. These are cut-pile carpets having highly twisted, evenly sheared, medium-length yarns. In a typical process, two-ply yarns with 3.5 to 5 turns/inch were heatset, tufted into a polypropylene primary backing, dyed and sheared. The carpets were finished by coating with a conventional SB latex and applying polypropylene secondary backing.

BCF manufactured according to this invention exhibits reduced flammability. It is believed that PPO while decomposing tends to form crosslinked polymer network, increases polymer melt viscosity at higher temperatures and therefore imparts improved fiber flame retardancy.

The following analytical techniques and procedures will further illustrate the invention:

Relative viscosity (RV) was determined with an Ubbelohde viscometer at 25° C. dividing flow time of polymer solution containing one gram of nylon polymer in 100 milliliters of 96% sulfuric acid by flow time of the pure 96% sulfuric acid for nylon 6 and 6I/6T copolymer. RV of PPO was determined in the similar way by using chloroform as solvent.

Tensile properties were determined by using Statimat and Instron. Measurements were conducted at the gauge length and cross head speed respectively 20 cm and 20 cm/min. Statimat allowed for automated and therefore more efficient analysis of a larger number (usually 10) of samples per each specimen. Denier defined as weight of single filament with the length of 9000 meters was determined by weighing 90 meters of yarn.

Melt flow index (MFI) of polystyrene was determined at 200° C. with the 50 kg load.

The modification ratio (MR) of a symmetrical trilobal filament was determined by dividing the radius of circumscribed circle by the radius of an inscribed circle.

Thermal shrinkage was determined from the following formula: $(L_0-L_1)/L_0 \times 100\%$ where $L_0$ is initial length of the fully extended yarn $L_1$ is length of the fully extended yarn after exposing to boiling water, autoclaving or Superba heatsetting treatment. A typical initial length $L_0$ was 40 cm. In order to straighten out the crimp and obtain a full yarn extension, a proper yarn pretension was applied depending on yarn denier.

Yarn bulk was characterized by using Texturmat. The initial and developed hot water bulk were measured. One meter skein and temperature of 95° C. were used.

Modified pill test was proposed based on the well known Methenamine Pill Test (Department of Commerce Standard DOC FF 1-70) because the results from latter method can vary greatly and are difficult to interpret. The new test involves measuring polymer burning time (PBT) on a knit fabric. PBT is defined as a time the polymer continue to burn after the methenamine pill extinguishes. A non-parametric Kruskal-Wallis test has been chosen to examine the significance of differences between sample averages because PBT does not follow a normal statistical distribution.

In an exemplary experiment, a knit fabric was prepared from a carpet yarn. Subsequently forty 2"×2" double layer samples were cut out from the fabric and dried in an oven as specified in DOC FF 1-70. Two 9"×9" jute backed saxony carpet samples with 11/16 inch pile height and 25 oz/yd² pile weight were also dried in the same oven. After drying all the specimens were allowed to cool down in a desiccator before testing. A dry, double fabric layer was then pinned to the secondary jute backing of the dry carpet, and the PBT was determined as previously defined. Forty measurements of PBT were conducted for the control and experimental sample, sorted in the ascending mode and ranked. The Kruskal-Wallis test evaluates ranks and not the actual experimental results. A parameter H is then computed and compared with CHISQ. If H is greater than CHISQ at chosen significance level (e.g., 0.05 in our experiments), it can be concluded that the average PBT's between control and experimental samples are significantly different. A rigorous treatment of the Kruskal-Wallis statistics can be found in the National Bureau of Standards Handbook 91.

Carpet wear evaluation was accomplished by using paired comparison test after exposing carpet samples to 60 000 foot traffics. Up to eleven observers conducted the test. The objective of the examination was to compare two worn carpets at a time and to select a carpet sample that had a better overall appearance. The data received from the observers were processed by using a preference table. The pooled variance and the least significant difference for the scores from the paired comparison test can be found in any handbook of statistics. The observer's entry was treated in the following way:

s represents the score $A_i$ represents sample i in a series $A_j$ represents sample j in a series t represents the total number of samples in the paired comparison evaluation If $A_i > A_j$ then $s_{ij}=1$ If $A_i = A_j$ then $s_{ij}=0.5$ If $A_i < A_j$ then $s_{ij}=0$ If $s_{ij}=1$ then $s_{ji}=0$ If $s_{ij}=0.5$ then $s_{ji}=0.5$ If $s_{ij}=0$ then $s_{ji}=1$ Therefore $s_{ji}=1-s_{ij}$ $$\Sigma s_{ij} = \frac{t(t-1)}{2}$$

Preference table for paired comparison evaluation of five samples:

|     |       | (j)      |          |          |          |          |              |
| --- | ----- | -------- | -------- | -------- | -------- | -------- | ------------ |
|     |       | $A_1$    | $A_2$    | $A_3$    | $A_4$    | $A_5$    | Total Score  |
| (i) | $A_1$ | —        | $s_{12}$ | $s_{13}$ | $s_{14}$ | $s_{15}$ | $\Sigma s_{1j}$ |
|     | $A_2$ | $s_{21}$ | —        | $s_{23}$ | $s_{24}$ | $s_{25}$ | $\Sigma s_{2j}$ |
|     | $A_3$ | $s_{31}$ | $s_{32}$ | —        | $s_{34}$ | $s_{35}$ | $\Sigma s_{3j}$ |
|     | $A_4$ | $s_{41}$ | $s_{42}$ | $s_{43}$ | —        | $s_{45}$ | $\Sigma s_{4j}$ |
|     | $A_5$ | $s_{51}$ | $s_{52}$ | $s_{53}$ | $s_{54}$ | —        | $\Sigma s_{5j}$ |

Heatsetting of BCF was conducted by using Superba machine at 121° or 129° C., or an industrial autoclave according to the exemplary cycle:

vacuum 3 min. at 230° F., release pressure 3 min. at 230° F., release pressure 3 min. at 270° F., release pressure 3 min. at 270° F., release pressure 6 min. at 270° F., release pressure vacuum

230° F.=110° C.

270° F.=132° C.

The invention is further illustrated by the examples that follow which are presented to show specific embodiments of the invention, but these examples should not be construed as limiting the spirit or the scope of the invention.

EXAMPLE 1

Nylon 6 BCF was prepared by using one step SDT process in the following manner. Dry nylon 6 chips (Ultramid®BS-700, BASF AG, Ludwigshafen, Germany) with RV of 2.74 were fed to an extruder and melted. The melt blend was thoroughly filtrated in the filtration pack prior to the filament extrusion. Filaments were then extruded through a spinerette containing 68 capillaries at a rate of 226 g/minute at 270° C., quenched with a cross flow of chilled air and subsequently drawn, textured in the hot air to form bulk continuous filament (BCF) and wound-up on a package. Drawing was conducted at 2200 meter/minute at about 3 times of fiber original length. Finish on yarn was 1.5%. The fiber cross section was trilobal. The final bulked continuous filament had 68 filaments.

Textured developed yarn bulk was 7.5%. Its physical properties before and after Superba heatsetting at 121° C. are reported in Table 1. The boiling water, autoclaving and Superba shrinkage correspondingly at 100°, 132° and 121° C. are reported in Table 2.

EXAMPLE 2

In order to improve the blend processability 90 parts by weight of poly(2,6-dimethyl-1,4-phenylene oxide) having the relative viscosity of 0.52 was compounded with 1 part of dimethyl fumarate and 9 parts of polystyrene with a melt flow index of 510 g/10 min at 265° C. in a twin-screw extruder equipped with kneading elements, devolatilized in vacuum, granulated and dried.

EXAMPLE 3

10 parts of the preblended PPO from Example 2, 88 parts of nylon 6 chips (Ultramid®BS-700, BASF AG, Ludwigshafen, Germany) with RV of 2.75, 2 parts of 6I/6T chips (I:T ratio=1.2:0.8) with RV of 1.49 were premixed in a tumbler, compounded in a twin-screw extruder at 270° C., granulated, dried and converted into BCF yarn as described in Example 1 by using SDT process.

Texturmat developed yarn bulk was 7.9%. Its physical properties before and after Superba heatsetting at 121° C. are reported in Table 1. The boiling water, autoclaving and Superba shrinkage correspondingly at 100°, 132° and 121° C. are reported in Table 2.

EXAMPLE 4

15 parts of the preblended PPO from Example 2, 83 parts of nylon 6 chips with RV of 2.74, 2 parts of 6I/6T chips (I:T ratio=1.2:0.8) with RV of 1.49 were premixed in a tumbler, compounded in a twin-screw extruder at 270° C., granulated, dried and converted into BCF yarn as described in Example 1 by using SDT process.

Texturmat developed yarn bulk was 7.9%. The physical properties before and after Superba heatsetting at 121° C. are reported in Table 1. The boiling water, autoclaving and Superba shrinkage correspondingly at 100°, 132° and 121° C. are reported in Table 2.

EXAMPLE 5

20 parts of the preblended PPO from Example 2, 79 parts of nylon 6 chips with RV of 2.74, 1 part of 6I/6T chips (I:T ratio=1.2:0.8) with RV of 1.49 were premixed in a tumbler, compounded in a twin-screw extruder at 270° C., granulated, dried and converted into BCF yarn as described in Example 1 by using SDT process.

Texturmat developed yarn bulk was 7.8%. Its physical properties before and after Superba heatsetting at 121° C. are reported in Table 1. The boiling water, autoclaving and Superba shrinkage correspondingly at 100°, 132° and 121° C. are reported in Table 2.

EXAMPLE 6

Two step nylon 6 BCF yarn was produced in the following manner. Dry nylon chips 6 with RV of 2.75 were fed to the extruder, melted, filtrated in the filtration pack and extruded at 270° C. through a spinnerette containing 68 capillaries at a rate of 199 g/minute, quenched with a cross flow of chilled air and wound-up on a package at 500 meters/minute. The fiber cross section was trilobal. In the subsequent step, the undrawn yarns were drawn about 3 times of their original length, texturized in a steam medium, and wound up on an appropriate package. The final bulked continuous filament had 68 filaments and a total denier of 1466 (i.e. 21.6 dpf). Two of these 1466 denier yarns were then twisted together with 3.5 turns/inch (tpi) and heatset by using Superba machine at 129° C. to produce heatset 2-ply yarn. The filament modification ratio was 2.59. The yarn physical properties after Superba heatsetting are given in Table 3. The polymer burning time is reported in Table 7.

A Saxony or cut pile carpet was then made by tufting 2-ply heatset yarns into a polypropylene backing on ⅛ gauge cut pile tufting machine at a stitch rate of 9 stitches/inch and a ½" pile height to give 40 oz/yd$^2$ fiber weight. Tufted carpets were dyed with an acid beige dyestuff, coated with a conventional SB latex containing calcium carbonate filler and then backed with secondary polypropylene backing. The carpet tufts were finally sheared to remove any undesired fuzz. The finished carpet was exposed to 60 000 foot traffics. The results of the paired comparison test on the worn and soiled carpets for the overall appearance retention are given in Table 4.

EXAMPLE 7

15 parts of the preblended PPO from Example 2, 80 parts of nylon 6 chips with RV of 2.75, were premixed in a tumbler, compounded in a twin-screw extruder at 270° C., granulated and dried. This blend was subsequently combined with 5 parts of 6I/6T chips (I:T ratio=1.2:0.8) having RV of 1.49 extruded through several static mixers and converted into two step BCF yarn, ply-twisted and heatset as described in Example 6. The filament, modification ratio was 2.60. The yarn physical properties after Superba heatsetting are given in Table 3. The polymer burning time is reported in Table 7.

A Saxony or cut pile carpet was then manufactured by tufting 2-ply heatset yarns, exposed to 60 00 foot traffics, evaluated for the overall appearance retention as described in Example 6 and shown in Table 4.

EXAMPLE 8

2-ply Superba heatset nylon 6 BCF yarn with a filament modification ratio of 2.78 was produced as described in Example 6. The yarn physical properties after Superba heatsetting are given in Table 5.

A Saxony or cut pile carpet was also manufactured by tufting 2-ply heatset yarns, exposed to 60 00 foot traffics, evaluated for the overall appearance retention as described in Example 6 and shown in Table 6.

EXAMPLE 9

20 parts of the preblended PPO from Example 2, 78 parts of nylon 6 chips with RV of 2.75, were premixed in a tumbler, compounded in a twin-screw extruder at 270° C., granulated and dried. This blend was subsequently combined with 2 parts of 6I/6T chips (I:T ratio=1.2:0.8) having RV of 1.49 extruded through a several static mixers and converted into two step BCF yarn, ply-twisted and heatset as described in Example 6. The filament modification ratio was 2.80. The yarn physical properties after Superba heatsetting are given in Table 5.

A Saxony or cut pile carpet was then manufactured by tufting 2-ply heatset yarns, exposed to 60 00 foot traffics, evaluated for the overall appearance retention as described in Example 6 and shown in Table 6.

The examples clearly illustrate the effectiveness of amorphous 6I/6T and PPO polymers for the preparation of spinnable, nylon compositions and BCF yarns with reduced thermal shrinkage, increased stiffness, decreased flammability, and improved carpet wear performance.

Although certain preferred embodiments of the present invention have been disclosed herein for illustrative purposes, it will be understood that various modifications thereof can be undertaken without departure from the basic underlying principles. Aforementioned modifications are therefore deemed to lie within the spirit and scope of the invention.

TABLE 1

PHYSICAL PROPERTIES OF ONE STEP BCF YARNS

| Example No. | BCF Composition (%) | Initial Denier | MR | Elongation (%) | | Tenacity (g/d) | | Modulus (g/d) | |
|---|---|---|---|---|---|---|---|---|---|
| | | | | Before and after Superba heatsetting | | | | | |
| 1 | Nylon 6 | 1266 | 2.52 | 36.1 | 61.9 | 2.78 | 1.96 | 9.5 | 5.7 |
| 3 | Nylon 6 with 9% PPO and 2% 6I/6T | 1328 | 2.95 | 32.8 | 49.4 | 2.51 | 1.92 | 9.3 | 6.5 |
| 4 | Nylon 6 with 13.5% PPO and 2% 6I/6T | 1325 | 3.29 | 30.8 | 44.2 | 2.33 | 1.81 | 9.8 | 6.9 |
| 5 | Nylon 6 with 18% PPO and 1% 6I/6T | 1348 | 3.45 | 29.0 | 38.6 | 2.39 | 1.79 | 11.0 | 7.5 |

TABLE 2

THERMAL SHRINKAGE OF BCF YARNS

| Example No. | BCF Composition | BWS (%) | Auto-claving Shrinkage (%) | Superba Shrinkage (%) |
|---|---|---|---|---|
| 1 | Nylon 6 | 7.5 | 10.2 | 19.1 |
| 3 | Nylon 6 with 9% PPO and 2% 6I/6T | 5.9 | 9.1 | 14.5 |
| 4 | Nylon 6 with 13.5% PPO and 2% 6I/6T | 5.3 | 8.5 | 11.6 |
| 5 | Nylon 6 with 18% PPO and 1% 6I/6T | 4.9 | 8.0 | 10.1 |

TABLE 3

PHYSICAL PROPERTIES OF 2-PLY SUPERBA HEATSET YARNS

| Example No. | BCF Composition | Denier | MR | Elongation (%) | Tenacity (g/d) | Modulus (g/d) |
|---|---|---|---|---|---|---|
| 6 | Nylon 6 | 3589 | 2.59 | 101.4 | 1.89 | 3.5 |
| 7 | Nylon 6 with 13.5% PPO and 5% 6I/6T | 3581 | 2.60 | 93.2 | 1.87 | 5.0 |

TABLE 4

TOTAL SCORES FROM PAIRED COMPARISON TEST FOR WORN CARPETS

| | Scores from Paired Comparison Test | |
|---|---|---|
| Observer No. | Example 6 Nylon 6 Carpet | Example 7 Nylon 6 carpet with 13.5% PPO and 5% 6I/6T |
| 1 | 0 | 1 |
| 2 | 0.5 | 0.5 |
| 3 | 0.5 | 0.5 |
| 4 | 0 | 1 |
| 5 | 0 | 1 |
| 6 | 0 | 1 |
| 7 | 0 | 1 |
| 8 | 0 | 1 |
| Totalscore: | 1 | 7 |

TABLE 5

PHYSICAL PROPERTIES OF 2-PLY SUPERBA HEATSET YARNS

| Example No. | BCF Composition | Denier | MR | Elongation (%) | Tenacity (g/d) | Modulus (g/d) |
|---|---|---|---|---|---|---|
| 8 | Nylon 6 | 3656 | 2.78 | 95.1 | 1.88 | 3.2 |
| 9 | Nylon 6 with with 18% PPO and 2% 6I/6T | 3532 | 2.80 | 89.4 | 1.94 | 5.0 |

TABLE 6

TOTAL SCORES FROM PAIRED COMPARISON TEST FOR WORM CARPETS

| | Scores from Paired Comparison Test | |
|---|---|---|
| Observer No. | Example 8 Nylon 6 Carpet | Example 9 Nylon 6 Carpet with 18% PPO and 2% 6I/6T |
| 1 | 0 | 1 |
| 2 | 0 | 1 |
| 3 | 0 | 1 |
| 4 | 0 | 1 |
| 5 | 0 | 1 |
| 6 | 0 | 1 |
| 7 | 0 | 1 |
| 8 | 0 | 1 |
| Totalscore: | 0 | 8 |

TABLE 7

POLYMER BURNING TIME DATA

| Example No. | BCF Composition | Polymer Burning Time (seconds) | CHISQ | Parameter H |
|---|---|---|---|---|
| 6 | Nylon 6 | 74.28 | 3.84 | 32.34 |
| 7 | Nylon 6 with 13.5% PPO and 5% 6I/6T | 21.75 | Samples significantly different at 0.05 level. | |

We claim:

1. A saxony carpet having a backing and a tufted pile surface on said backing, said tufted pile surface including carpet fibers formed of a polymer blend comprised of:
   (a) from about 70 to about 99.85% by weight of a nylon polymer;
   (b) from about 0.05 to about 5% by weight of an amorphous polyamide miscible with the nylon polymer (a), and
   (c) from about 0.1 to about 35% by weight of an amorphous polymer immiscible with the nylon polymer (a) which is at least one selected from the group consisting of poly(phenylene oxides), polymethyl methacrylates, bisphenol A polycarbonates, polyethersulfones, polyarylethersulfones, polyphenylsulfones and bisphenol A polysulfones.

2. The saxony carpet of claim 1, wherein said nylon (a) is at least one nylon selected from the group consisting of nylon 6 and nylon 6,6.

3. The saxony carpet of claim 1, wherein said amorphous polyamide (b) is a copolymer of hexamethylenediamine, isophthalic acid (I) and terephthalic acid (T).

4. The saxony carpet of claim 3, wherein said isophthalic acid (I) and said terephthalic acid (T) are each present in an amount to provide a ratio (I):(T) of from 0.5:1 to 2:1.

5. The saxony carpet of claim 1, wherein said immiscible amorphous polymer (c) is a poly(phenylene oxide).

6. The saxony carpet of claim 5, wherein said poly(phenylene oxide) is modified by with an $\alpha,\beta$-unsaturated compound.

7. The saxony carpet of claim 6, wherein said $\alpha,\beta$-unsaturated compound is at least one selected from the group consisting of $\alpha,\beta$-unsaturated aliphatic mono-and dicarboxylic acids, $\alpha,\beta$-unsaturated aliphatic mono-and dicarboxylic esters, $\alpha,\beta$-unsaturated aliphatic mono-and dicarboxylic amides, $\alpha,\beta$-unsaturated aliphatic mono-and dicarboxylic imides, and aromatic vinyl monomers.

8. A saxony carpet having a backing and a tufted pile surface on said backing, said tufted pile surface including carpet fibers formed of a polymer blend comprised of:
   (a) from about 70 to about 99.85% by weight of nylon-6;
   (b) from about 1 to about 5% by weight of an amorphous copolymer derived from hexamethylenediamine, isophthalic acid (I), and terephthalic acid (T); and
   (c) from about 10 to about 25% by weight of an amorphous poly(phenylene oxide) polymer immiscible with the nylon-6.

9. A saxony carpet as in claim 8, wherein the amorphous copolymer (b) has a ratio of (I) to (T) of from about 0.5:1 to about 2:1.

10. The saxony carpet as in claim 8, wherein said amorphous copolymer (b) is present in an amount of about 2 wt. % or less.

11. A saxony carpet as in claim 8, wherein said poly(phenylene oxide) is modified by melt mixing with an $\alpha,\beta$-unsaturated compound.

12. The saxony carpet as in claim 1 or 8, wherein said carpet fibers comprise bulk continuous fibers.

13. The saxony carpet as in claim 1 or 8, wherein said carpet fibers have a denier in the range of 15 to 25.

* * * * *